(12) United States Patent
Summerer

(10) Patent No.: US 8,173,244 B2
(45) Date of Patent: May 8, 2012

(54) TRANSPARENT SHEET-LIKE SHAPED PLASTIC PART WITH CONCEALED SPRUE MARK, AND PROCESS FOR PRODUCING IT

(76) Inventor: Franz Josef Summerer, Rimsting (DE)

( * ) Notice: Subject to any disclaimer, the term of this patent is extended or adjusted under 35 U.S.C. 154(b) by 1488 days.

(21) Appl. No.: 11/034,199

(22) Filed: Jan. 13, 2005

(65) Prior Publication Data

US 2005/0158519 A1 Jul. 21, 2005

(30) Foreign Application Priority Data

Jan. 14, 2004 (DE) .................... 10 2004 002 012
Mar. 5, 2004 (DE) .................... 20 2004 003 468

(51) Int. Cl.
*B32B 3/00* (2006.01)
*B60J 1/00* (2006.01)

(52) U.S. Cl. ............ 428/161; 428/38; 428/77; 428/164; 428/172; 428/192; 428/207; 296/84.1

(58) Field of Classification Search .................. 428/161, 428/164, 172, 38, 77, 192, 207; 296/84.1
See application file for complete search history.

(56) References Cited

U.S. PATENT DOCUMENTS

| | | | |
|---|---|---|---|
| 4,773,614 A * | 9/1988 | Makino et al. ................ | 242/347 |
| 4,874,654 A | 10/1989 | Funaki et al. | |
| 4,935,184 A | 6/1990 | Sorensen | |
| 5,045,268 A | 9/1991 | Sorensen | |
| 5,413,743 A | 5/1995 | Prophet | |
| 5,642,228 A | 6/1997 | Takezawa et al. | |
| 5,721,039 A * | 2/1998 | Yanagihara et al. .......... | 428/172 |
| 5,756,013 A | 5/1998 | Yanagihara et al. | |
| 5,882,553 A | 3/1999 | Prophet et al. | |
| 5,922,369 A | 7/1999 | Yanagihara et al. | |
| 6,244,653 B1 | 6/2001 | Nishio et al. | |
| 6,461,704 B1 | 10/2002 | Matsco et al. | |
| 6,468,458 B1 | 10/2002 | Anderson et al. | |
| 6,637,164 B2 | 10/2003 | Kondo et al. | |
| 6,641,770 B2 | 11/2003 | Schieberl | |
| 2001/0030385 A1 | 10/2001 | Schieberl | |
| 2003/0021917 A1* | 1/2003 | Hotaka et al. ................... | 428/29 |
| 2003/0183495 A1* | 10/2003 | Kashino ....................... | 200/341 |

FOREIGN PATENT DOCUMENTS

| | | |
|---|---|---|
| DE | 26 07 231 | 9/1976 |
| DE | 40 38 492 A1 | 6/1992 |
| DE | 44 17 404 A1 | 11/1994 |
| DE | 196 55 079 C2 | 4/1998 |
| DE | 196 55 079 C2 | 8/1999 |

(Continued)

OTHER PUBLICATIONS

"Auto Glazing: Window of Opportunity for Molders" by Mikell Knights, Apr. 2006, in Plastics Technology.

(Continued)

*Primary Examiner* — Donald J Loney
(74) *Attorney, Agent, or Firm* — Staas & Halsey LLP

(57) ABSTRACT

A transparent sheet-like shaped plastic part, in particular a plastic pane, on account of the use of a direct injection-molding process during production of the shaped plastic part (1), has at least one sprue mark (4) located on an optical surface (1.2) of the shaped plastic part (1). The sprue mark (4) is covered by a covering material (2) of lower transparency than the shaped plastic part (1).

17 Claims, 2 Drawing Sheets

FOREIGN PATENT DOCUMENTS

| | | |
|---|---|---|
| DE | 102 02 246 A1 | 8/2003 |
| DE | 102 33 679 A | 2/2004 |
| DE | 102 33 679 A1 | 2/2004 |
| DE | 20 2004 003 468 U1 | 7/2004 |
| DE | 10 2004 002 012 A1 | 8/2005 |
| DE | 601 30 413 T2 | 6/2008 |
| EP | 1 190 831 A1 | 3/2002 |
| EP | 1 555 106 B1 | 7/2005 |
| JP | 2-227224 | 9/1990 |
| JP | 9-267363 A | 10/1997 |
| JP | 2004-14423 | 1/2004 |
| WO | WO 99/42274 | 8/1999 |
| WO | 99/44802 | 9/1999 |
| WO | WO 99/44802 | 9/1999 |
| WO | 00/30824 | 6/2000 |
| WO | 01/28744 A1 | 4/2001 |

OTHER PUBLICATIONS

Bayer, "ATI 8043d Makrolon®/Apec® Transparenz und Farbe", Oct. 2001.

* cited by examiner

TRANSPARENT SHEET-LIKE SHAPED PLASTIC PART WITH CONCEALED SPRUE MARK, AND PROCESS FOR PRODUCING IT

FIELD OF THE INVENTION

The invention relates to a transparent sheet-like shaped plastic part and to a process for producing it.

DESCRIPTION OF RELATED ART

Sheet-like transparent optical shaped parts, such as for example motor vehicle windows, have hitherto generally been made from glass. In recent times, optical shaped parts made from plastics have become increasingly important on account of the lower weight, the higher impact strength and in particular the increased freedom of design.

On account of the high injection pressures required, large-area, transparent shaped plastic parts with a low wall thickness are difficult to produce in technological terms. In addition, in the case of transparent shaped parts there are high quality requirements with regard to the optical quality (absence of streaks, absence of stresses, avoidance of sinking), and to comply with these requirements entails additional work. A further difficulty which needs to be overcome when producing large-area shaped plastic parts relates to the problem of supplying the plastic. In many cases, an edge-side feed of the moulding compound is required in order to obtain a shaped part with optically perfect surfaces, i.e. without disruptive sprue marks.

To avoid sprue marks on optical surfaces of a transparent sheet-like shaped plastic part, what is known as the film gate process is used. In this process, the gate for injection of the shaped part is located laterally outside the mould cavity in which the shaped part is produced (known as "indirect injection-moulding"). Between the gate point and an edge region of the mould cavity designed as a sprue extension, there is what is known as a film plate, into which runners are machined, these runners, starting from the gate point, being distributed over the film plate and linking the film plate to the mould cavity over the entire width of the latter. After the moulding compound has cooled in the mould cavity, the shaped part is removed from the open mould, with the moulding compound which has been supplied via the film plate being formed integrally on the shaped part as a lateral extension of the latter as sprue cold runners (known as sprue extension).

On account of the lateral or edge-side supply of plastic which is implemented in the film gate technique, there are no sprue marks on optical surfaces. However, a drawback is that the sprue extension together with the sprue cold runners has to be separated from the shaped part, requiring an additional working step. Furthermore, the separation of the sprue extension produces a relatively extensive loss of material.

Direct injection-moulding processes, in which the moulding compound is introduced directly from the hot runner into the mould cavity, for example via a needle valve nozzle or a blocking slide, are already used to produce non-optical shaped parts. Unlike in the film gate technique, the plastic is not supplied laterally in the direction of the surface plane of the shaped part, but rather is fed to a surface of the shaped part. The main advantage of direct injection is that the sprue separation which is required when using the film gate standard process, together with the associated increased materials costs, are eliminated. However, when producing optical shaped parts, the problem arises that the injection has to take place onto an optical surface of the shaped part and consequently the sprue mark which is formed (on a visible surface, usually the rear side of the sheet-like shaped part) remains visible through the transparent shaped part. Therefore, direct injection-moulding processes have not hitherto been considered for the production of optical shaped parts.

BRIEF SUMMARY OF THE INVENTION

The present invention is based on the object of providing a transparent sheet-like shaped plastic part with perfect optical properties and low materials costs. A further object of the invention is to provide a process for producing an optical shaped part of this type.

The object on which the invention is based is achieved by the features of the independent claims. Advantageous configurations and refinements of the invention are given in the subclaims.

The transparent sheet-like shaped plastic part, in particular plastic pane, according to the invention has at least one sprue mark which is located on an optical surface of the shaped plastic part and occurs as a result of the shaped plastic part being produced by means of a direct injection-moulding process. According to the invention, the sprue mark is covered by a covering material of lower transparency than the shaped plastic part.

The covering of the sprue mark by the covering material means that the sprue mark is "shadowed at the rear", i.e. transmits much less light than is available for revealing the sprue mark without covering material. The result of this is that the sprue mark in practice is no longer evident or is only evident when studied much more closely to the user through the transparent shaped plastic part. Since in many cases when using transparent shaped parts, such as for example panes, it is possible and often even desirable to fit an edge-side, frame-like covering, the solution according to the invention can be deployed in numerous applications. An additional factor is that transparent shaped parts are generally observed and looked at in significantly greater detail in their central region than in edge regions. Since the sprue mark is preferably located in the region close to the edge of the optical surface, there is to this extent still a physiological effect (higher observation threshold) which makes it more difficult to observe the sprue rib or separation mark. The covering of the sprue mark in accordance with the invention allows a direct injection-moulding process to be used to produce the shaped plastic part.

The sprue mark is preferably a sprue rib which protrudes from the optical surface or a separation mark where a sprue rib of this type has been separated from the optical surface. A sprue rib occurs, for example, if a blocking slide hot runner closure is used for injection-moulding production of the sheet-like shaped plastic part. However, it is also possible for the sprue mark to represent a different form of surface inhomogeneity. By way of example, if a needle valve closure is used in a hot runner employed in a direct injection-moulding process, the imprint mark of the needle is produced on the optical surface of the sheet-like shaped plastic part.

It is preferable for the covering material to be a plastics material which has been injection-moulded onto the shaped plastic part. Shaped plastic parts of this type are also known as two-component mouldings, since a first plastic component forms the transparent shaped plastic part and the second plastic component forms the covering. Two-component shaped plastic parts of this type can be produced at low cost in an injection-moulding machine with a special plate turner for injection-moulding the second component onto the first component which has already been produced. The invention can now be used to produce optical two-component mouldings without having to use the expensive film gate technique. The advantage of using a moulded-on plastics material as covering is also that, on account of this moulding taking place at a high temperature and a high pressure, homogeneous surface fusion occurs between the sprue mark and the plastics material (covering), thereby ensuring minimal visibility of the sprue mark.

If the covering is produced by a moulded-on plastics material, a first advantageous variant embodiment is characterized in that at least one sprue rib which protrudes from the optical surface is provided with a free-standing sheathing of the plastics material. In this case, the sprue rib continues to project with respect to its surroundings, and the covering of the sprue rib in accordance with the invention is merely effected by means of a thin covering of the sprue rib with covering material. An advantage of this is that only a small amount of covering material is required for this measure.

According to an alternative variant embodiment, it is possible to provide that at least one sprue rib which protrudes from the optical surface is completely embedded in the plastics material. In this case, the sprue rib has completely disappeared in the plastics material, i.e. can no longer be recognized even from the side to which the plastics covering material has been applied. A solution of this type is recommended in particular if, for design reasons, a relatively thick border or frame of covering material is to be fitted to the sheet-like shaped plastic part.

Another possibility consists in the covering material being a paint which has been applied to the shaped plastic part. In this case, a sprue rib which protrudes from the optical surface of the shaped plastic part is sheathed by the paint.

A further advantageous measure is characterized in that the shaped plastic part has a tint, e.g. a coloured tint. Even a relatively slight tint, which reduces the transparency of the shaped plastic part in a scarcely perceptible way, reinforces the concealing action of the covering material in the region of the sprue mark considerably.

With regard to the covering material, particularly good results are achieved with a completely opaque covering material, since in this case "rear illumination" of the sprue mark is completely eliminated.

Furthermore, it is advantageous to use a black covering material, since in this way the reflected light available for detection of the sprue mark (e.g. sprue rib or the separation mark of the latter or needle imprint mark) is minimized.

The transparent sheet-like shaped plastic part according to the invention is advantageously used as a window pane of a motor vehicle. In this application, it is often possible to combine a number of the measures mentioned (application of a two-component black border with sufficient wall thickness and tinting of the pane), with the result that in practice the optical defect caused by the sprue mark can be virtually completely concealed. The expensive film gate process for producing the pane can in this way be avoided.

To produce a sheet-like transparent shaped plastic part, first of all the shaped plastic part is produced by means of a direct injection-moulding process, with the result that at least one sprue mark is formed on an optical surface of the shaped plastic part. This visible sprue mark is covered with a covering material of lower transparency than the shaped plastic part. The combination according to the invention of a direct injection-moulding process and the covering of the sprue mark which is then inevitably formed in order to conceal the latter makes it possible to produce perfect optical shaped plastic parts in an inexpensive way.

The term optical surface, in the case of a sheet-like transparent shaped plastic part is to be understood as meaning the top or bottom surface of the shaped part, but not the side edge surface. The optical surface on which the sprue mark is located is in this case that surface of the shaped plastic part which is to the rear with respect to the direction in which an observer views the pane.

BRIEF DESCRIPTION OF THE DRAWINGS

The invention is described in more detail below on the basis of an exemplary embodiment and variants thereof and with reference to the drawings, in which.

DETAILED DESCRIPTION OF THE INVENTION

Figure 1:
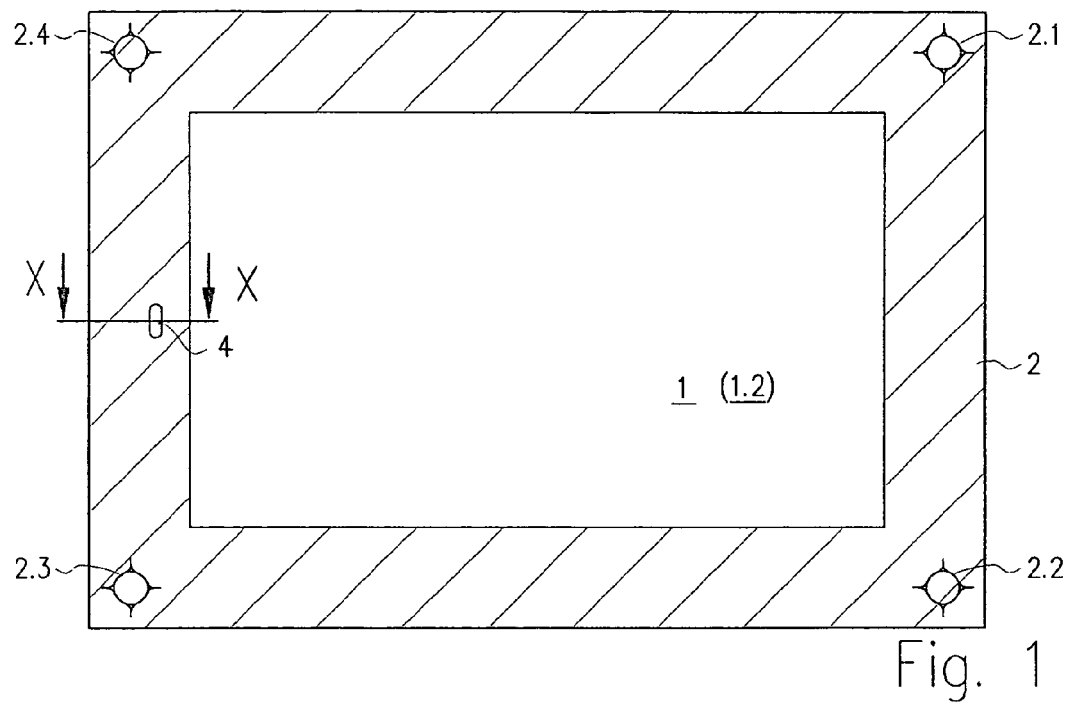
FIG. 1 shows a transparent plastic pane having a plastic border injection-moulded onto the rear side of the pane, in the form of a plan view onto the rear side of the plastic pane.

The plastic pane 1 consists over its entire area of a transparent plastics material and has, for example, a substantially rectangular contour. That side of the plastic pane 1 which faces the observer in FIG. 1 is the rear side of the plastic pane 1. As will be explained in more detail below and as can be seen from the sectional illustration presented in FIGS. 2 and 3, a sprue rib 4 protrudes on this rear side. The sprue rib 4 is located on an optical surface of the plastic pane 1 in the region close to the edge of the latter.

What is known as a black border 2 has been injection-moulded onto the rear side of the plastic pane 1. The black border surrounds the plastic pane 1 in the form of a closed frame. The black border 2 is realized by injection-moulding a moulding compound of low or non-existent transparency onto the transparent plastic pane 1, which has already been completed. The position of the sprue rib 4 is selected in such a way that the sprue rib 4 is located in a region within the black border 2.

The thickness of the transparent plastic pane 1 may, for example, be 4 mm. The side lengths of the transparent plastic pane 1 are of the standard dimensions for motor vehicle windows or sliding roofs, i.e. are generally greater by a factor of more than 50 than the thickness of the plastic pane 1. Integral securing elements 2.1, 2.2, 2.3, 2.4 can be formed integrally onto the black border 2 in order to secure the plastic pane 1, for example to a slide mechanism.

Without the black border 2, the sprue rib 4 is clearly visible both from the rear side and the front side of the plastic pane 1. Detaching or separating off the sprue rib does not change this state of affairs, since the separating surface continues to be clearly recognizable even from the front side of the plastic pane 1 (i.e. when looking through the pane).

Figure 2:
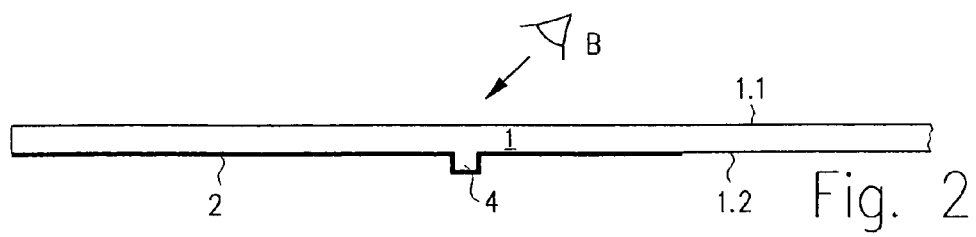
FIG. 2 shows a partially sectional view of the plastic pane illustrated in FIG. 1 on line X-X in accordance with a first variant of the invention.
Figure 3:
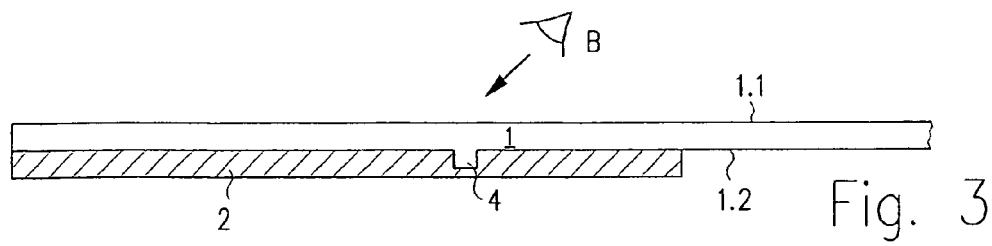
FIG. 3 shows a partially sectional view of the plastic pane illustrated in FIG. 1 on line X-X in accordance with a second variant of the invention.

According to the invention, a direct injection-moulding process, e.g. with a hot runner blocking slide closure, is used to produce the plastic pane 1, and the sprue rib 4 which is then inevitable is covered by the black border 2. FIGS. 2 and 3 show a two possible variants for this purpose. In FIG. 2, the thickness of the black border 2 is less than the height of the sprue rib 4 above the rear side 1.2 of the plastic pane 1. In this case, the sprue rib is sheathed by the black border 2. The result of this is that light is no longer incident on the sprue rib 4 from the rear side. The sprue rib 4 is then scarcely visible or no longer visible at all to an observer B viewing the front side 1.1 of the transparent plastic pane 1.

A second variant consists, in accordance with FIG. 3, in completely embedding the sprue rib 4 in the black border 2. In this case, the contour of the sprue rib 4 disappears in the black border 2 and can also no longer be recognized from the rear side of the plastic pane 1. The black border 2, which is used, for example, in sliding roofs of motor vehicles, therefore simultaneously solves the problem of concealing the sprue rib 4 when the plastic pane 1 is observed from the viewing side.

The thickness of the black border 2 in FIG. 2 may, for example, be 2 mm, and the thickness of the black border 2 in FIG. 3 may, for example, be 5 mm.

It is not necessary for the sprue rib 4 to be separated for optical reasons, but this separation may be performed should, for example, overall height restrictions make it appear desirable to do so. In this case, the black border 2 conceals the separation mark.

Figure 4:
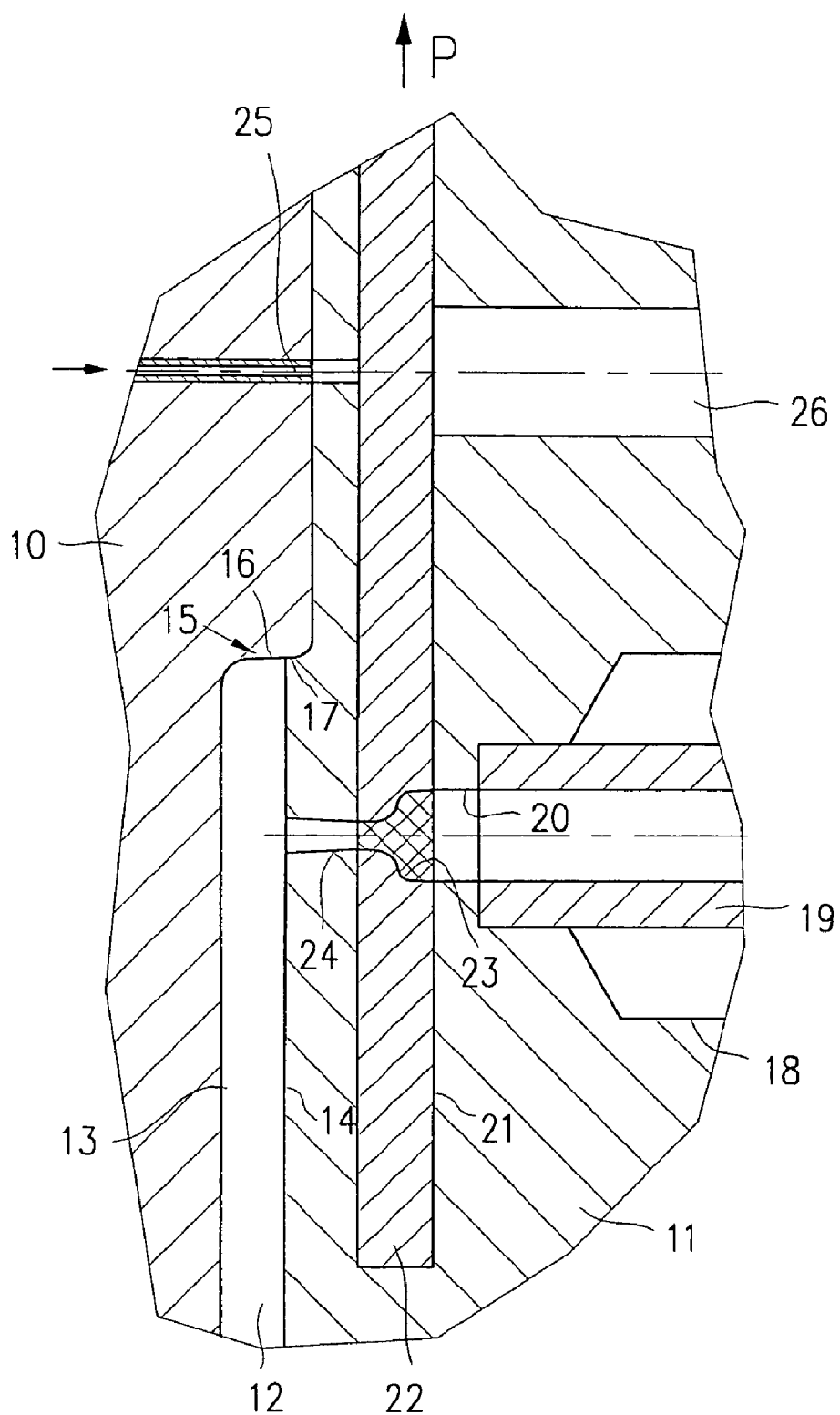
FIG. 4 shows a sectional illustration of an excerpt from an injection mould for producing the sheet-like plastic pane and for explaining a direct injection-moulding process.

FIG. 4 shows an excerpt from a mould used to produce the plastic pane 1 by means of a direct injection-moulding process. In accordance with the standard design of an injection mould, the mould comprises two mould plates 10, 11, between which a cavity 12 is formed. The cavity 12 is realized by a recess 13 in the mould plate 10 (referred to as the female mould plate) and by a projection 14 (known as the mould core) in the mould plate 11 (known as the mould core plate). The cavity 12 is delimited by a vertical flash face clearance 15, which is defined by a female-mould-side flash face 16 and a core-side flash face 17.

A plastics feed unit 18 which is machined into the mould core plate 11 is used to introduce transparent moulding compound, which is liquid during the filling operation, into the cavity 12 in order to produce the plastic pane 1. The plastics feed unit 18 comprises what is known as a hot runner 19 with a central hot runner passage 30, via which liquid plastic is passed from a plastics source (not shown) toward the cavity 12. During injection-moulding operation, the hot runner 19 is always held at a temperature which is above the solidification point of the moulding compound, so that the plastic is always in liquid form in the hot runner 19.

The hot runner passage 20 opens out into a groove 21 which has been machined in the mould core plate 11 and in which a blocking slide 22 is accommodated such that it can be slideably guided. The blocking slide 22 is oriented in a plane perpendicular to the hot runner passage 20 and can be pulled out of the groove 21 from the position shown in FIG. 4 in the direction indicated by arrow P.

The blocking slide 22 has a through-passage 23, which in the position of the blocking slide 22 shown in FIG. 2 is connected to the hot runner passage 20. A runner 24 provided in the mould core plate 11 connects the through-passage 23 in the blocking slide to the cavity 12.

During the filling operation, liquid moulding compound is passed from the hot runner passage 20, via the through-passage 23 and the runner 24, into the cavity 12. As soon as the cavity 12 has been sufficiently filled, the blocking slide 22 is displaced in the direction of arrow P. A residue of plastic which remains behind in the through-passage 23 and solidifies is expelled via an ejector 25 and an ejector bore 26 provided in the mould core plate 11. At the same time, the moulding compound contained in the runner 24 also sets and forms the sprue rib 4 formed integrally on the plastic pane 1.

It should be noted that other closure mechanisms (e.g. needle nozzle closures, etc.) can also be used in a direct injection-moulding process. However, it is inevitable that a sprue rib 4 (in the case of a blocking slide closure) or some other form of surface defect (an imprint mark of the nozzle needle in the case of a needle nozzle closure) will always remain behind in the region of an optical surface of the plastic pane 1. The presence of a surface defect (sprue mark) of this type in the region of an optical surface of the plastic pane can only be avoided, as has been mentioned above, by the film gate technique, i.e. an indirect injection-moulding process, which is laterally linked in the region of the vertical flash face clearance 15. In this case, however, the abovementioned drawbacks (high loss of material, separation of the sprue extension) have to be accepted.

To inject the second component onto the plastic pane 1, the mould core plate 11 is exchanged for a different mould core plate (known as the secondary injection mould plate—not shown in FIG. 4). The solidified plastic pane 1 remains in the female mould plate 10. The secondary injection mould core plate (not shown) is of similar configuration to the mould core plate 11, except that the mould core 14 has a recessed portion which is arranged at the edge side and the shape of which is complementary to the shape of the second component (e.g. black border 2) which is to be applied by injection-moulding. The moulding compound for moulding on the second component is introduced, via a plastics feed which opens out into this recessed portion, into the injection-moulding cavity which is produced between the recessed portion of the mould core of the secondary injection mould plate and the surface of the plastic pane 1.

To summarize, the invention provides a transparent sheet-like shaped plastic part which, while being simple and inexpensive to produce by means of a direct injection-moulding process, despite the presence of a sprue rib (or some other visible sprue mark caused by the injection-moulding of the transparent shaped plastic part) on an optical surface, nevertheless complies with the requirements imposed with regard to the absence of optical inhomogeneities on optical surfaces.

The invention claimed is:

1. A window pane of a motor vehicle, comprising:
a shaped plastic part which is transparent and has at least one sprue mark located on a first optical surface of the shaped plastic part, the at least on sprue mark being visible when seen through an uncovered second optical surface of the shaped plastic part after a direct injection-moulding process of manufacturing the shaped plastic part; and
a covering material covering at least a portion of the first optical surface and the at least one sprue mark, to make the at least one sprue mark less visible when seen through the uncovered second optical surface, the covering material having a lower transparency than the shaped plastic part.

2. The window pane of a motor vehicle according to claim 1, wherein the at least one sprue mark is a sprue rib which protrudes from the first optical surface or a separation mark where a sprue rib of this type has been separated from the first optical surface or an imprint mark of a needle of a needle valve closure.

3. The window pane of a motor vehicle according to claim 1 or 2, wherein the sprue mark is located in a region close to an edge of the first optical surface.

4. The window pane of a motor vehicle according to claim 1, wherein the covering material is a plastics material which has been injection-moulded onto the shaped plastic part.

5. The window pane of a motor vehicle according to claim 4, wherein at least one sprue rib which protrudes from the first optical surface is provided with a free-standing sheathing of the plastics material.

6. The window pane of a motor vehicle according to claim 4, wherein at least one sprue rib which protrudes from the first optical surface is completely embedded in the plastics material.

7. The window pane of a motor vehicle according to claim 1 or 2, wherein the covering material is a paint which has been applied to the shaped plastic part.

8. The window pane of a motor vehicle according to claim 7, wherein at least one sprue rib which protrudes from the first optical surface is sheathed by the paint.

9. The window pane of a motor vehicle according to claim 1, wherein the shaped plastic part has a tint.

10. The window pane of a motor vehicle according to claim 1, wherein the covering material is completely opaque.

11. The window pane of a motor vehicle according to claim 1, wherein the covering material is black.

12. The window pane of a motor vehicle according to claim 1, wherein the covering material runs continuously around the shaped plastic part in the manner of a frame.

13. The window pane of a motor vehicle according to claim 1, wherein the first optical surface is the inside window pane surface and the second optical surface is the outside window pane surface.

14. The window pane of a motor vehicle according to claim 1, wherein the window pane is a roof window pane of a motor vehicle.

15. The window pane of a motor vehicle according to claim 1, wherein the covering material comprises integral securing elements for securing the window pane to the motor vehicle.

16. An automobile window, comprising:
a transparent plastic layer on a surface of which at least one sprue mark is located after a direct injection-moulding process of manufacturing the transparent plastic layer, the surface on which the sprue mark is located forming an inside surface of the automobile window; and
a covering layer covering at least a portion of the surface and the at least one sprue mark to make the at least one sprue mark less visible when seen through an outside surface of the automobile window, the covering layer having a lower transparency than the transparent plastic layer.

17. A window pane of a motor vehicle, comprising:
a shaped plastic part manufactured by an injection molding process, the shaped plastic part being transparent and having at least one sprue mark located on a first optical surface thereof, the first optical surface of the shaped plastic part forming an inside surface of the window pane; and
a covering material covering at least a portion of the first optical surface and the at least one sprue mark, the covering material having a lower transparency than the shaped plastic part to make the at least one sprue mark scarcely visible or no longer visible at all when seen through an uncovered second optical surface of the shaped plastic part forming an outside surface of the window pane.

* * * * *